US012565087B2

(12) United States Patent (10) Patent No.: US 12,565,087 B2
Sviberg et al. (45) Date of Patent: Mar. 3, 2026

(54) ROOF ASSEMBLY HAVING A ROOF OPENING SYSTEM AND AN AIR CONDITIONER

(71) Applicant: Webasto SE, Stockdorf (DE)

(72) Inventors: Magnus Sviberg, Stockdorf (DE); Maximilian Ehrmann, Stockdorf (DE); Cédric Langlais, Stockdorf (DE); Michael Hülsen, Stockdorf (DE); Juraj Lehotsky, Stockdorf (DE); Fabian Will, Stockdorf (DE); Thomas Podolski, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 380 days.

(21) Appl. No.: 18/200,862

(22) Filed: May 23, 2023

(65) Prior Publication Data

US 2023/0382204 A1 Nov. 30, 2023

(30) Foreign Application Priority Data

May 31, 2022 (DE) ..................... 10 2022 113 740.6

(51) Int. Cl.
*B60J 7/02* (2006.01)
*B60H 1/00* (2006.01)
(Continued)

(52) U.S. Cl.
CPC .......... *B60J 7/022* (2013.01); *B60H 1/00271* (2013.01); *B60H 1/245* (2013.01); *B60J 7/0084* (2013.01); *B60H 2001/003* (2013.01)

(58) Field of Classification Search
CPC ......... B60J 7/022; B60J 7/0084; B62D 25/06; B62D 25/07; B60H 1/245; B60H 1/0027;
(Continued)

(56) References Cited

U.S. PATENT DOCUMENTS 4,332,416 A * 6/1982 Lutz .......................... B60J 7/022
296/213
5,374,099 A 12/1994 Huyer
(Continued)

FOREIGN PATENT DOCUMENTS

DE 69219968 T2 10/1997
DE 102004051380 A1 5/2006
(Continued)

*Primary Examiner* — Dennis H Pedder
(74) *Attorney, Agent, or Firm* — Fitch, Even, Tabin & Flannery, LLP

(57) ABSTRACT

A roof assembly for forming a vehicle roof on a motor vehicle, the roof assembly has a panel component which forms at least sections of a roof cladding of the vehicle roof, the roof cladding acting as an outer sealing surface, and a roof opening system having a lid part which is configured to selectively open or close a roof opening provided in the panel component, and at least one electric and/or electronic and/or electromagnetic component and an air conditioner, via which waste heat released by the electronic component and/or heat introduced from outside are able to be dissipated, wherein the roof opening system has at least one water gutter via which at least one cooling channel of the air conditioner is formed, the waste heat of the component and/or the heat introduced from outside being able to be dissipated from the roof assembly via cooling channel.

17 Claims, 3 Drawing Sheets

(51) Int. Cl.
  *B60H 1/24* (2006.01)
  *B60J 7/00* (2006.01)

(58) Field of Classification Search
  CPC .... B60H 2001/003; B60H 2001/00307; B60R
  11/04; B60R 11/0258; B60R 11/0264;
  G01S 17/931
  USPC ..... 296/210, 213, 180.1, 217; 454/137, 139,
  454/140, 141
  See application file for complete search history.

(56) References Cited

U.S. PATENT DOCUMENTS

| | | | | |
|---|---|---|---|---|
| 10,561,044 | B2 * | 2/2020 | Schmidt | H05K 7/20272 |
| 11,813,992 | B2 * | 11/2023 | Huelsen | G01S 17/931 |
| 2008/0061603 | A1 * | 3/2008 | Romig | B60J 7/0084 |
| | | | | 296/213 |
| 2009/0267387 | A1 | 10/2009 | Leroy | |
| 2020/0387174 | A1 * | 12/2020 | Diehl | B60W 30/16 |
| 2022/0283263 | A1 * | 9/2022 | Huelsen | G01S 13/931 |
| 2023/0073687 | A1 * | 3/2023 | Lindner | B60H 1/245 |

FOREIGN PATENT DOCUMENTS

| | | | |
|---|---|---|---|
| DE | 102004022012 | B4 | 10/2015 |
| DE | 202019101094 | U1 | 5/2020 |
| JP | S59143776 | A | 8/1984 |

* cited by examiner

ROOF ASSEMBLY HAVING A ROOF OPENING SYSTEM AND AN AIR CONDITIONER

CROSS-REFERENCE TO RELATED APPLICATION

This application claims priority from German Patent Application Number 10 2022 113 740.6, filed on May 31, 2022, which is hereby incorporated herein by reference in its entirety for all purposes.

FIELD

The invention relates to a roof assembly for forming a vehicle roof on a motor vehicle according to the preamble of claim 1.

BACKGROUND

Generic roof modules, in particular those comprising a roof module, are widely used in vehicle manufacturing. For instance, roof modules can be prefabricated as separate functional modules and can be delivered to the assembly line when assembling a roof frame structure (which is part of the chassis structure). The roof module at least partially forms a roof cladding of the vehicle roof which prevents dampness and air flows from entering the vehicle interior. The roof cladding is composed of one or more panel components, which can be made of a stable material, such as painted metal or painted or solid-colored plastic. The roof module can be a part of a fixed vehicle roof or a part of an openable roof sub-assembly, for example a sliding roof.

Furthermore, the development in vehicle manufacturing is increasingly focusing on autonomously and partially autonomously driving motor vehicles. In order to enable the vehicle controller to control the motor vehicle autonomously or partially autonomously, a plurality of environment sensors (e.g., lidar sensors, radar sensors, (multi-) cameras, etc. including other (electrical) components) are employed, which are integrated in the roof module, for example, and which chart the environment surrounding the motor vehicle and determine, for example, a current traffic situation from the acquired environment data. Roof modules which are equipped with a plurality of environment sensors are also known as roof sensor modules (RSM). For this purpose, the known environment sensors transmit and/or receive electromagnetic signals, such as laser beams or radar beams, allowing a data model of the vehicle environment to be generated by suitable signal evaluation and to be used for controlling the vehicle.

For the best possible and reliable mode of operation, safety and availability of the autonomous or partially autonomous driving mode, an as uninterrupted and consistent as possible availability of the environment sensors and the other (electric) components is required. A persisting set of problems which can cause the (temporary) failure of an environment sensor is, for example, heat building up around the environment sensor because of which it can overheat and fail. A heat build-up of this kind is not only caused by intrinsic waste heat of the environment sensor owing to operation but alternatively or additionally owing to a hot outside climate, i.e., surrounding warmth, for example during midsummer, leading to overheating (for example, of only individual electronic components of the environment sensor). A hot outside climate or strong solar radiation can lead to the entire roof cladding becoming extremely heated, in particular owing to the exposed position of the environment sensor on the upper side of the roof cladding.

To prevent these heat-related problems, it is therefore desirable to forestall potentially arising heat built-ups by using an air conditioner. While the advantages of using such an air conditioner are generally known, they are not widely used in current roof modules for autonomous or partially autonomous driving modes, meaning no uninterrupted availability of the environment sensors can be ensured by effectively dissipating heat from the environment sensors, antennae and other electronic components at this point in time.

Some technical approaches envisage air inlets, e.g., in the form of radiator grills, disposed on the outside on the roof cladding and some even cooling fans disposed on the outside on the roof cladding. The exterior cooling ribs and/or cooling fans generally provide an air flow required for cooling the electric components of the roof module.

However, a positioning in this manner can permit foreign particles and contaminations to easily enter the ventilation space and can lead to the cooling performance being impaired, for example. In addition, known air conditioners or conditioning concepts for a roof module generally require an additional plurality of components which need to be mounted and serviced, whereby a corresponding effort is increased for mounting and servicing. Moreover, existing approaches generally require a large installation space which is a scarce commodity in the automobile industry. If, moreover, no installation space large enough is available, an air conditioner is at least partially moved elsewhere in one or more add-ons on the roof module in known cooling concepts. This stands in opposition to the desired optical appearance of the roof module on the one hand. On the other hand, approaches of this kind result in disadvantages regarding a desired robustness when designing components of the roof module and often impair making available a required impermeability and dirt-resistance (e.g., of a vent) of the roof module. There is also the difficulty with air-cooling systems of water entering the air-conducting system and leading to corrosion in that space, for example. For this reason, draining concepts which often have a complex design are required for existing approaches, for example.

SUMMARY

These disadvantages are to be overcome or reduced by integrated solutions of this invention optimized regarding installation space, production and assembly.

An object of the invention in the present case is therefore to propose a roof assembly having an improved design, in particular optimized regarding installation space, which at least reduces the disadvantages described above of the known state of the art.

This object is attained by a roof assembly according to the teachings of claim 1. Further, the object is attained by a motor vehicle having at least one roof assembly as intended by the invention.

Advantageous embodiments of the invention are the subject matter of the dependent claims. Moreover, any and all combinations of at least two features disclosed in the description, the claims, and/or the figures fall within the scope of the invention. Naturally, the explanations given in connection with the roof assembly equivalently relate to the motor vehicle according to the invention and vice-versa, without being mentioned separately in its context. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The roof assembly according to the invention comprises a panel component which forms at least sections of a roof cladding of the vehicle roof, the roof cladding acting as an outer sealing surface. Further, the roof assembly comprises a roof opening system having a lid part which is configured to selectively open or close a roof opening provided in the panel component. Equally, the roof assembly comprises at least one electric and/or electronic and/or electromagnetic component and an air conditioner via which waste heat released by electronic component and/or heat introduced from outside is able to be dissipated. The roof assembly is characterized in that the roof opening system comprises at least one water gutter via which at least one cooling channel of the air conditioner is formed, the waste heat of the component and/or the heat introduced from outside being able to be dissipated from the roof assembly via the cooling channel.

In particular for future (partially) autonomously driving vehicles, a wide use of the thermal management concept according to the invention is desirable. The air conditioner according to the invention lends itself to dissipating heat from environment sensors and other electric or electronic components. Particularly preferably, the roof assembly is a roof sensor module. The solution as intended by the invention also preferably allows providing fewer air inlets and/or outlets (if required) and moreover positioning these more optimally (along the edge area), whereby a styling and an optical appearance of the roof module is improved.

According to the invention, the at least one cooling channel, which is at least partially formed by the at least one water gutter (preferably, albeit not necessarily, in interaction with other components), can be used for effectively dissipating waste heat and/or external heat from the roof assembly. In this context, the water gutter of the roof opening system, which is already present for functional reasons, can be used additionally for dissipating heat in a technically synergetic manner. The air conditioner according to the invention has the advantage that the use of the water gutter(s) is optimized with regard to installation space in the edge area around the roof opening. This solution according to the invention makes it possible to dissipate the waste heat of several electronic components installed around the edge contour of the roof assembly via a shared cooling channel formed by the water gutter. The shape of the water gutters preferably follows the edge contour of the roof opening. Consequently, it is possible to dissipate the waste heat of all electric and/or electronic components of the roof assembly together using only one cooling channel which is preferably provided as a closed frame channel surrounding the roof opening via the water gutters. This reduces the number of components in contrast to known concepts and also significantly improves a mounting of the air conditioner. In particular, the invention allows a simple production or simple mounting of the air conditioner. In this manner, the air conditioner can be easily integrated in a single work step in the production line. Equally, water management within the air conditioner can be improved according to the invention. According to the invention, a design and styling of the roof assembly can moreover be improved with respect to generic roof assemblies owing to the reduced number of components. In other words, the invention increases design liberties.

The electric or electronic components can be of the kind which interact with an environment sensor. Alternatively or additionally, the components can also be of the kind which are placed merely in physical proximity to the environment sensor (i.e., in an adjoining installation space) and can passively heat them via their waste heat, as it were. Consequently, the air conditioner can effectively prevent the environment sensor from becoming heated from surrounding components. It is thus ensured that the environment sensor functions in a thermally stable manner. Generally, the at least one electronic component can be a computing unit and/or an evaluation unit and/or an antenna (or an antenna module) and/or a light source (or a light module) and/or any other electronic device which generates waste heat.

"At least one" is understood to mean that the roof assembly can comprise one or more of the respective components. The surrounding heat introduced from outside can be, for example, waste heat from other electric and/or electronic components installed in the roof assembly. Besides the at least one cooling channel, which is formed at least partially by the water gutter as intended by the invention, the "air conditioner" can comprise other cooling components, in particular other cooling channels, cooling-air inlets and/or cooling-air outlets which together form the air conditioner. The air conditioner can be a cooling device and/or a heating device. Consequently, the air conditioner is preferably not only configured to dissipate heat and/or waste heat from the at least one component, but can also generally be used to heat the at least one component before the vehicle is in operation, for example. The air conditioner in its entirety is provided to cool and/or to regulate the temperature of one or more electric and/or electronic and/or mechanical and/or mechatronical components disposed in the roof assembly (depending on the surrounding conditions, this can also imply a heating of components). For this purpose, the air conditioner comprises all components which directly or indirectly interact with regulating the temperature of the roof assembly.

In a preferred embodiment, the roof opening system and/or the air conditioner is configured to move the lid part in an in particular minimal opening position so that an air exchange between a vehicle exterior and the water gutter, via which the at least one cooling channel of the air conditioner is formed, can be improved in this manner. By sending out a command, the roof opening system can cause the lid part to be displaced into a predetermined conditioning position by controlling a drive. The predetermined conditioning position can be a predetermined opening position of the lid part in which an exchange of air is made possible, without the covering effect of the lid part is affected. The lid part can merely be lifted from a seal in order to enable air to enter and/or circulate between the water gutter and the exterior, without, however, rain water being able to enter an interior of the vehicle through the roof opening. For instance, the lid part can be opened only a few millimeters to a few centimeters. The lid part can be opened via a translational movement and/or a rotational movement.

In a preferred embodiment, the at least one water gutter is disposed in an edge area of the roof opening, in particular surrounding the roof opening, and is configured to drain water entering through the roof opening from the roof assembly via at least one rear and/or frontal and/or lateral water outlet. Preferably, several water outlets can be provided, making it possible to drain water around the roof assembly, for example. The water can also be drained via an A pillar and/or a B pillar and/or a C pillar and/or a D pillar of a vehicle chassis, on which the roof assembly is disposed.

The water outlet is preferably coupled at least with a section of one of the water gutters in a flow-conducting and/or liquid-conducting manner, meaning water entering the water gutter(s) can be drained from the roof assembly via the at least one water outlet. The water gutter(s) is/are preferably tub-shaped and are preferably opened towards the outside in the direction of a vehicle environment when the lid part is opened. The water gutter(s) can preferably be disposed around the roof opening preferably on the panel component and/or any other frame structure and/or support structure of the roof assembly. This allows collecting liquid entering through the roof opening via an edge of the roof opening by the water gutter(s) independently of the leakage point. The water gutter(s) preferably form(s) a channel frame which is disposed around the roof opening below the panel component (in the direction of a vehicle interior).

In a preferred embodiment, the air conditioner comprises at least one supply channel having a cooling-air inlet, the supply channel being coupled with the water gutter in particular in a flow-conducting manner. In this embodiment, the cooling-air inlet is coupled directly or indirectly with at least one of the water gutters in a flow-conducting manner via the supply channel. In this manner, the exterior air can enter through the cooling channel formed by the water gutter(s) via the cooling-air inlet and thus enter the roof assembly and enable dissipating heat. This design also makes it possible to forego a plurality of otherwise required components for the air conditioner. The water gutters provided in any case, in contrast, are (also) used synergistically to dissipate heat. In this embodiment, at least sections of the at least one component is thermally coupled directly or indirectly with the at least one water gutter in order to enable transferring heat from the component to the water gutter in this manner. For instance, sections of the water gutter can be in direct contact with a casing of the component, meaning heat is transferred via this contact. An indirect thermal coupling is possible by interconnecting further components.

In an alternative embodiment, the air conditioner can be configured to suction required cooling air from a vehicle interior and/or a vehicle floor space and/or an air conditioning of a vehicle. In this embodiment, the air conditioner does not necessarily need to comprise a cooling-air inlet, but can suction and/or obtain the cooling or conditioning air from an area of the vehicle.

In a preferred embodiment, the air conditioner comprises at least one other cooling channel having a cooling-air inlet, at least sections of the at least one other cooling channel being coupled with the water gutter in particular in a flow-conducting manner. This embodiment poses a preferred alternative to a direct flow-conducting coupling with the water gutter. In this context, the air conditioner comprises another cooling channel which preferably conducts the coolant or the cooling air to the at least one water gutter starting from the cooling-air inlet to the at least one component only to discharge it from the water outlet (when the lid is closed) or from the roof opening (when the lid part is at least partially opened). In a preferred embodiment, the at least one other cooling channel is coupled directly or indirectly with the at least one component in a heat-conducting manner. For instance, sections of the other cooling channel can be in direct contact with a casing of the component, meaning heat is transferred via this contact. An indirect thermal coupling is also possible by interconnecting other components.

In a preferred embodiment, the roof opening system comprises at least one set of roof opening kinematics and at least one guide rail in which the lid part is moveably guided in particular linearly along the at least one guide rail for selectively opening and closing the roof opening, the at least one guide rail comprising the at least one water gutter. Particularly preferably, the at least one guide rail extends essentially (±10%) parallel to the longitudinal vehicle direction. Particularly preferably, at least the water gutters, which extend essentially parallel to the longitudinal vehicle direction, are formed by the at least one guide rail. Particularly preferably, the roof opening comprises two edge areas which extend essentially parallel to the longitudinal vehicle direction and two edge areas which extend essentially (±10%) orthogonally to the longitudinal vehicle direction. The water gutter can be formed, for example, as another groove in the guide rail in which the lid part is not moveably guided.

In a preferred embodiment, a seal is provided between a sealing flange of the panel component and the lid part, the seal being configured to prevent liquid from entering through the roof opening at least in a closed position of the lid part. The lid part is flush with the surrounding panel component in the closed state. The seal is preferably disposed so as to surround the lid part, for example on an edge of the lid part, for example plugged thereon. The seal alternatively can be disposed on the sealing flange of the panel component. The seal abuts against the sealing flange in the closed state of the lid part (when disposed on the lid part) or against the edge of the lid part (when disposed on the sealing flange) and thus prevents dampness from entering through the roof opening.

In a preferred embodiment, the at least one water gutter comprises an abutment seal which is disposed on an edge of the water gutter and is configured to prevent dampness from entering between the water gutter and the lid part. The abutment seal is, for example, plugged on an edge of the water gutter(s). The abutment seal seals a gap between the water gutter(s) and the lid part. The abutment seal is preferably in a sealing or abutting contact with the lid part when the lid part is in the closed position and/or during the opening and/or closing movement.

In a preferred embodiment, the cooling channel is circumferentially limited by the water gutter, the abutment seal, the lid part, the seal and the sealing flange at least in the closed position of the lid part. The cooling channel formed by the water gutter preferably extends as a type of hollow channel along the edge area of the roof opening. Particularly preferably, the cooling channel surrounds the entire edge area of the roof opening as a channel frame. The cooling channel has a hollow cross section viewed orthogonally to its length. A wall side of the cooling channel on the bottom side (i.e., in the direction of a vehicle interior) is preferably formed by the water gutter. A lateral wall of the cooling channel directed in the direction of a roof opening center is preferably formed by the water gutter. A lateral wall of the cooling channel oriented in the direction of the roof opening center is preferably formed by a protruding wall section of the water gutter, on whose self-supporting edge the abutment sealing is fastened, for example plugged on to. The wall section together with the abutment sealing preferably forms a channel wall. A channel wall of the cooling channel on the top side (i.e., in the direction of the vehicle exterior) is preferably formed by the lid part in a liquid-proof interaction with the seal. A lateral channel wall formed in the area of the edge of the roof opening and preferably protruding from the panel component in the direction of a vehicle interior is preferably formed by the sealing flange formed on the panel component and by a protruding wall section of the water gutter, which is fastened particularly preferably directly on the panel component or indirectly on the panel component via a carrier structure.

In a preferred embodiment, the at least one cooling channel is configured to obtain a coolant supply from outside of the roof assembly. Thus, it is possible, for example for the roof assembly to comprise one or more inlet openings, for example, in the form of ventilation slits, via which fresh air can be conducted from outside to the roof assembly. This at least one inlet opening can preferably be provided in the front in the area of a frontal transverse beam or longitudinal beam of the roof assembly in a lateral area parallel to at least one of the at least two longitudinal beams. A lateral coolant supply (inlet opening) is advantageous in this case, as it becomes more difficult for rain water to enter the cooling channel. Preferably, a kind of lattice or filter is installed in an inlet opening of this kind, particles being able to be intercepted from the suctioned surrounding air by the lattice or filter and thus not being able to enter the air conditioner. An arrangement of this kind of at least one air inlet has the advantage that movement of the vehicle forces an air stream, meaning no additional, noise-emitting fans are required for forming the coolant flow at least once a predetermined speed limit of the vehicle has been reached. Thus, a low-noise operation is possible in the roof installation space by preventing or at least minimizing the use of cooling fans.

In a preferred embodiment, the at least one water gutter and/or the cooling channel formed at least partially by the cooling channel is formed so as to surround the roof opening. In this embodiment, at least one water gutter is preferably formed in one piece or at least contiguously, meaning dampness is prevented from entering through the roof opening around the roof opening or leaking liquid is collected by the at least one water gutter.

In a preferred embodiment, the at least one electric and/or electronic component is disposed in a dry compartment of the roof assembly protected against dampness and the waste heat released by the electric and/or electronic component can be dissipated from the dry compartment by means of the air conditioner. Thus, it is possible to dispose the electric and/or electronic component in a casing or the like, for example, so as to be protected from dampness. Heat can be dissipated from a casing of this kind directly at the cooling channel, which is formed at least partially by the water gutter. For this purpose, the casing can be in direct contact with the cooling channel, for example, via at least one surface. Alternatively, the casing can be connected to the cooling channel in a heat-conducting manner via a heat conductor. This allows a more liberal positioning of the electric and/or electronic component in the installation space of the roof assembly. A division between a dry compartment and a wet compartment formed by the air conditioner makes it possible to dampen the coolant flow to increase the amount of accommodatable heat.

It is also preferred for the at least one electric and/or electronic component to be directly or indirectly connected to the cooling channel provided by the water gutter and/or another cooling channel via at least one heat conductor in a heat-conducting manner. It can also be preferred if the at least one air conditioner comprises at least one cooling fan and/or at least one cooling body and/or at least one heat exchanger and/or at least one heat pump and/or at least one heat-conducting tube. Other components known from thermal management (e.g., a compressor or a condenser) are also generally conceivable.

Alternatively or additionally, the air conditioner can also have one or more cooling fans in order to thus be able to generate an air stream in the cooling channel of the air conditioner by means of the one or more cooling fans, for example at merely low speeds of the vehicle or when the cooling fan(s) is/are connected to the cooling cycle of the vehicle. Preferably, the one or more cooling fans are controllable in such a manner that different volume flows can be set through the cooling channel(s). The cooling fans are preferably integrated in the cooling channel(s).

Alternatively or additionally, at least sections of the at least one electric and/or electronic component can be disposed on the cooling section and/or be connected to the cooling channel in a heat-conducting manner via a heat conductor. It is particularly preferable if the at least one electric and/or electronic component is directly contacted with the preferably metal part of the cooling channel in a heat-conducting manner by means of the (metal) casing of the electric and/or electronic component so exchanging heat without loss is possible. In this context, the (metal) casing of the least one electric and/or electronic component, which preferably forms the dry area, can be disposed on an exterior of the transverse beam or the longitudinal beam of the roof module frame via a plane abutment surface, for example. To prevent heat loss during exchange, a heat-conducting paste can preferably be applied between the abutting surfaces.

Alternatively to directly positioning the at least one electric and/or electronic component on the cooling channel, it is preferred to provide a heat exchange between the at least one electric and/or electronic component and the cooling channel via one or more heat conductors. In a particularly preferred embodiment, a heat sinker and/or a heat exchanger and/or a heat pump and/or a sheet-metal part and/or a heat pipe are used as a heat conductor and/or the heat conductor can be connected to a heat-conducting paste or a different heat-conducting material. Naturally, a combination of the previously enumerated heat conductors, i.e., not only one type of heat conductor, can be used. It is moreover understood that all heat-generating components of the roof assembly can be equipped with at least one heat conductor. Thus, the at least one electric and/or electronic component can, for example, comprise one or more heat conductors. In any case, the heat conductor forms a heat-exchange bridge between the at least one electric and/or electronic component and the at least one cooling channel, allowing the waste heat or the surrounding heat to be transferred to the at least one cooling channel without loss. The use of a heat conductor has the advantage that the degree of design liberties is increased because of this, as the at least one electric and/or electronic component does not have to be disposed directly on the cooling channel, but can be positioned more arbitrarily.

Equally, for increasing the efficiency of exchanging heat between the at least one electric and/or electronic component and the cooling channel and for increasing the conducting of heat within the cooling channel, it can be advantageous for the air conditioner to comprise a cooling body which preferably has a plurality of cooling ribs. For instance, the cooling body can be a metallic component (preferably made of aluminum) which has a plurality of notches and protrusions to increase its surface for heat dissipation in order to conduct as much heat as possible, which is dissipated by the at least one electric and/or electronic component, to the coolant flow flowing in the cooling channel. Particularly preferably, the cooling body is disposed directly on the heat-exchange surface between the at least one electric and/or electronic component and the cooling channel and/or the other cooling channel (in the case of the environment sensor being disposed directly on the cooling channel). Alternatively, the cooling body can be disposed in a heat-introduction position of the heat conductor to dissipate the heat from there as efficiently as possible.

The type of electric and/or electronic components to be cooled by the air conditioner according to the invention is generally arbitrary. Preferably, the at least one electric and/or electronic component comprises one or more antennae and/or an antenna module and/or a control device and/or a light module and/or a light generator and/or an environment sensor, which is comprised in the roof module and can transmit and/or receive electromagnetic signals for charting the vehicle environment through a see-through area.

In a preferred embodiment, the at least one environment sensor can comprise a lidar sensor and/or a radar sensor and/or a camera sensor and/or a multi-camera sensor and/or an ultrasonic sensor and/or rain sensors. Other sensor types not mentioned but used in the field of roof modules are also included.

In a preferred embodiment, the roof assembly comprises a roof module which is fastened as a structural unit to a vehicle chassis, in particular to a roof chassis frame, of a motor vehicle, in particular via a roof module frame. The roof module can form a structural unit, in which the features for autonomously or partially autonomously driving or for driving supported by driving assistance systems are integrated and which are placed on a vehicle carcass by a vehicle manufacturer as one unit, for example fastened on a vehicle chassis and/or a roof frame structure. The longitudinal beams extend essentially along a longitudinal direction of the motor vehicle. The transverse beams preferably extend in a vehicle width direction of the motor vehicle, i.e., transversely, preferably perpendicular and essentially horizontally to the traveling direction of the motor vehicle. Preferably, the roof module can be connected, for example glued, screwed and/or bolted, to the roof frame structure of a motor vehicle via the roof module frame. Furthermore, the roof module according to the invention can be designed as a rigid roof only or even as a roof including a roof opening system. The roof module can be placed on top of or inserted in the roof frame structure, which forms part of a vehicle chassis. The roof module can be designed for use in a passenger vehicle or a utility vehicle. The roof module can preferably be provided as a structural unit in the form of a roof sensor module (RSM), in which the environment sensors and other electronic components are provided for (partially) autonomously driving. It is also conceivable for the roof module to comprise one or more antenna modules and/or further electric components. Furthermore, it is also possible for the roof module to comprise one or more environment sensors and/or one or more antenna modules and/or other electric or electronic components, at least one selected component previously mentioned being able to be cooled via the air conditioner according to the invention.

In a preferred embodiment, the invention relates to a motor vehicle, which comprises at least one roof assembly according to any one of the embodiments of the invention.

Of course, the embodiments and the exemplary embodiments mentioned above and yet to be discussed below can be realized not only individually but also in any combination with each other without departing from the scope of the present invention. Moreover, any and all embodiments and exemplary embodiments of the roof assembly also relate to a motor vehicle comprising such a roof assembly in their entirety.

BRIEF DESCRIPTIONS OF THE DRAWINGS

Embodiments of the invention are schematically shown in the drawings and are described in the following in an exemplary manner.

DETAILED DESCRIPTION

Figure 1:
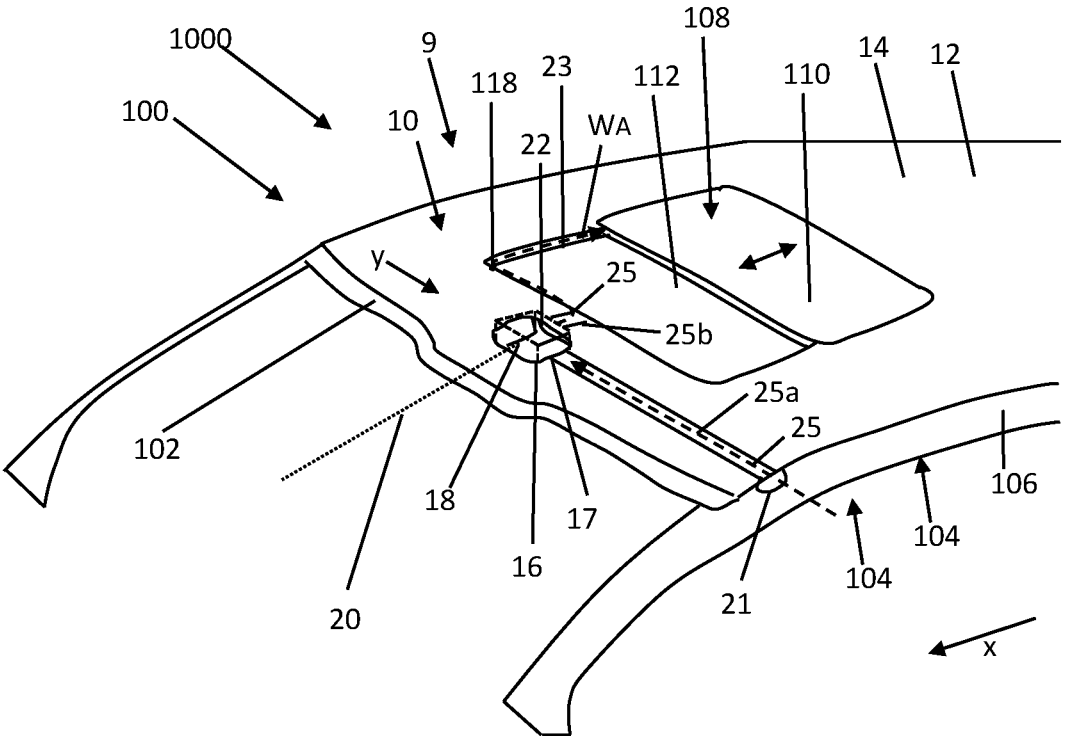
FIG. 1 shows a schematic view of an exemplary embodiment of a motor vehicle having a roof module according to the invention.

In FIG. 1, a vehicle roof 100 of a vehicle 1000 (not shown in its entirety) is shown, vehicle roof 100 comprising a roof assembly 9 according to the invention. Roof assembly 9 is designed as roof module 10 in the present case. Roof module 10 comprises a panel component 12 for forming a roof cladding 14 of vehicle roof 100 which functions as an outer sealing surface. Roof module 10 optionally comprises a roof module frame on which panel component 12 is disposed or to which panel component 12 is captively fastened, most commonly glued. Roof module 10 is disposed as a structural unit on a roof chassis frame 104 of vehicle 1000, presently inserted thereon. Roof chassis frame 104 comprises a frontal and a rear transverse chassis beam 102, only frontal transverse chassis beam 102 being visible. Furthermore, roof chassis frame 104 comprises at least two longitudinal chassis beams 106. Roof chassis frame 104 is presently part of the vehicle chassis of motor vehicle 1000.

In the exemplary embodiment shown in FIG. 1, roof module 10 has a roof opening system 108 designed as a sliding roof. Roof opening system 108 comprises a set of roof opening kinematics (not shown) and a lid part 110. Lid part 110 can be displaced between an open position and a closed position by the roof opening kinematics. In the open position, a roof opening 112 is open into a vehicle interior in panel component 12. In the closed position, lid part 110 closes roof opening 112 preferably in a liquid-proof manner. Lid part 110 preferably closes so as to be flush with roof cladding 114 and/or panel component 12 in the closed position. Lid part 110 can be made of plastic or sheet metal or glass.

Between roof opening 112 and lid part 110, a seal 114, e.g., a bundled-coil seal, is preferably provided so roof opening 112 can be closed in a liquid-proof manner towards the interior in the closed position. According to FIGS. 2 and 3, seal 114 is disposed on lid part 110, in particular in an edge area of lid part 110. Seal 114 interacts with a sealing flange 116 provided in an edge area around roof opening 112.

While opening lid part 110, it is lifted at least in a partial movement, in particular pivoted about a pivoting axis, in order to thus be extracted via roof cladding 114. Subsequently, lid part 110 is moved in a rearward direction via a rail guide on the exterior of roof cladding 114, for example, in order to entirely open roof opening 112. In particular after rainfall or a wash, it can occur that liquid residue remains on lid part 110 and/or roof cladding 114 in the form of water droplets. When tilting lid part 110 and/or when driving vehicle 1000, these water droplets can enter roof opening 112 via an edge area of roof opening 112. An undesired effect would be the getting wet of the vehicle interior.

To prevent liquid from entering via an edge area of roof opening 112, known roof opening systems often comprise water gutters 118 disposed at the edge and surrounding roof opening 112. Water gutters 118 can be formed at least in the side area of the roof opening 112, which extends essentially parallel to longitudinal vehicle direction x, as a component of the guide rails of roof opening system 108. If water enters roof opening 112 via the edge area of roof opening 112, the water can be collected by at least one water gutter 118. The water can subsequently be drained preferably via at least one water outlet 120, which leads out of vehicle 1000 on the rear side. Of course, roof module 10 and/or vehicle 1000 can also comprise multiple water outlets 120. Water gutters 118 are preferably provided surrounding roof opening 112 and preferably form a closed frame surrounding roof opening 112. From this frame, the water can preferably be guided from the rear side through the at least one water outlet 120. To prevent water in water gutters 118 from entering an interior of vehicle 1000, each water gutter 118 is sealed against lid part 110 via an abutment seal 122, in particular a lip seal. Abutment seal 122 can be inserted on an edge 123 of water gutters 118, for example (see FIGS. 2 and 3). Edge 123 is preferably oriented orthogonally with respect to roof cladding 14 and/or panel component 112 and/or lid part 110, at least when viewed in a local area around roof opening 112.

Furthermore, roof module 10 comprises an electric and/or electronic component 16 in a frontal area (when viewed in longitudinal vehicle direction x, which corresponds to a moving direction of vehicle 1000) symmetrically to longitudinal vehicle direction x. Electric and/or electronic component 16 presently is an environment sensor 17. Environment sensor 17 is disposed directly behind a frontal transverse chassis beam 102, which defines a roof header in a connection to a windshield (not shown) of vehicle 1000. Environment sensor 17 can be disposed so as to be extractable and retractable or rigid on panel component 12. Environment sensor 17 is presently a lidar sensor. Other sensor types, such as multi-directional cameras or cameras used for partially autonomously or autonomously driving a vehicle, can be used. Different electric and/or electronic components 16 can be installed in roof module 10.

Roof module 10 (and/or environment sensor 17) comprises a see-through area 18, which can be made of preferably shatter-proof plastic, glass or other partially transparent or transparent material, for example. Environment sensor 17 is oriented along an optical axis 10, which is oriented parallel to longitudinal vehicle direction x in the case of FIG. 1. A field of view of environment sensor 17 extends in a conical shape around optical axis 20, environment sensor 17 being able to transmit and/or send electromagnetic signals in this field of view in order to thus chart a vehicle environment.

Roof module 10 according to the invention further comprises an air conditioner 22, via which waste heat released by electronic component 16, e.g., an environment sensor 17, and/or heat introduced from the outside to roof module 10 can be dissipated. According to the invention, air conditioner 22 comprises at least one cooling channel 23 formed by at least one of water gutters 118. In this manner, a waste heat or heat can be dissipated from water outlet 120 by using water gutter 118 as cooling channel 134. This allows a synergetic use of water gutter 118 for dissipating heat. Component 16 can be connected to at least one of water gutters 118 in a heat-conducting, in particular flow-conducting, manner via at least one other cooling channel 25, for example. Alternatively or additionally, it is possible for at least one component 16 to be connected to the at least one water gutter 118 in a heat-conducting manner in addition to further cooling channel 25 via a heat conductor (not shown), e.g., a heat-conducting sheet, a heat-conducting tube or the like. Equally, other thermal couplings are also conceivable. Generally, roof module 10 and/or air conditioner 22 can have at least one frontal (when viewed in traveling direction x) lateral air inlet 21 in another cooling channel 25 (which air conditioner 22 comprises in addition to cooling channel 23 formed by water gutter 118). Via air inlet 21, cooling air can flow into further cooling channel 25. Further cooling channel 25 is coupled with component 16 in a thermal or heat-conducting manner, meaning waste heat can be introduced to further cooling channel 25 by component 16. The air flowing in via air inlet 21 can accommodate the waste heat. A first channel section 25a of further cooling channel 25 leads from cooling-air inlet 21 to further component 16. From component 16, a second channel section 25 of cooling channel 25 leads to cooling channel 23 formed by water gutter 118. Further cooling channel 25 and/or at least second channel section 25b is coupled with the at least one water gutter 118 in a flow-conducting manner, meaning cooling air can flow out of water outlet 120 via water gutter 118 after it has accommodated the waste heat generated by component 116 or heat introduced from outside. In this manner, the waste heat/heat can be dissipated in a rearward direction (in the opposite direction of traveling direction x) in a heat-dissipation direction $W_A$ and can be dissipated from roof module 10. Air conditioner 22 according to the invention preferably does not require a cooling fan for generating a forced air stream. However, air conditioner 22 naturally can optionally have at least one cooling fan if it can increase the cooling effect, for example.

Figure 2:
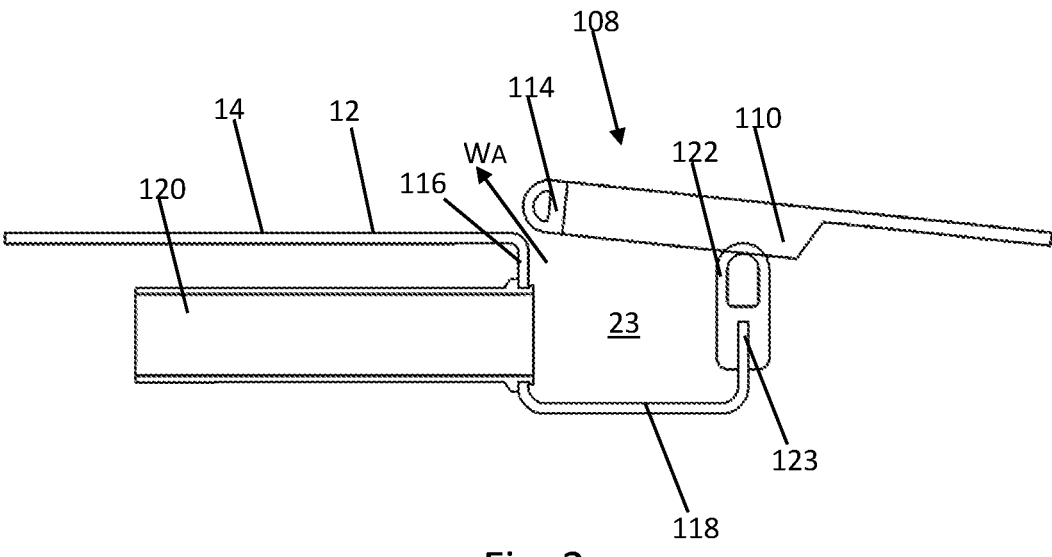
FIG. 2 shows a cut through a section of a roof module.

If lid part 110 is open, heat dissipates directly from roof opening 112 as intended by the invention, without a dissipation via water outlet 120 being required. The heat rather dissipates at the location of least dissipation resistance, consequently the location of the largest discharge cross section (see FIG. 2). In FIG. 2, a cut view parallel to longitudinal vehicle direction x is shown. In this context, a rearward part of roof opening system 108 is shown.

Figure 3:
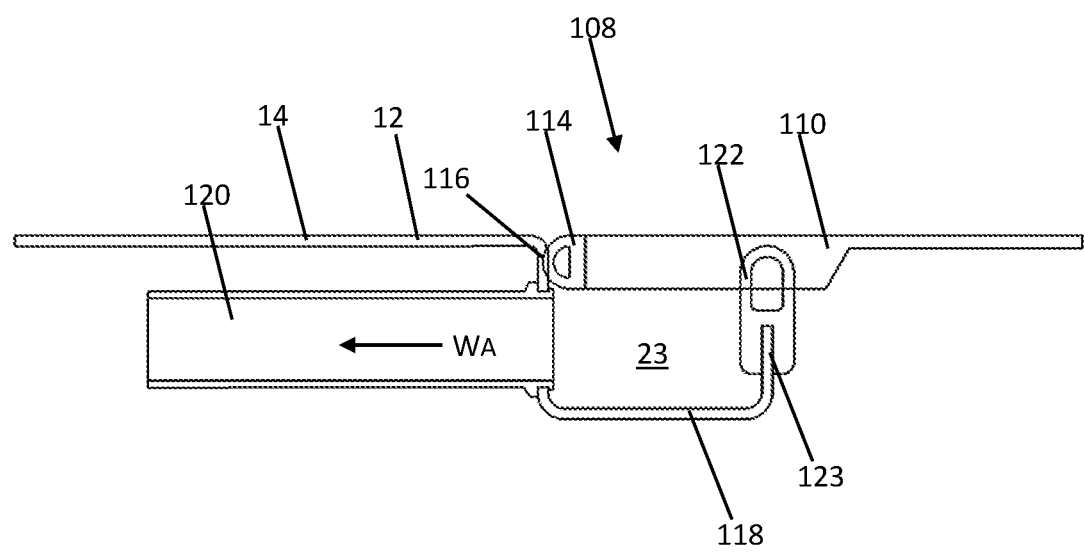
FIG. 3 shows a cut through a section of a roof module.

If lid part 110 is closed, a channel is formed which is preferably liquid and airtight towards the outside and can be used as a flow channel for dissipating heat, meaning the warm waste heat can be dissipated outward from roof module 10 via water outlet 120 in this case. In this context, water gutter 118 forms a bottom wall and a part of a channel lateral wall. Abutment seal 122 in interaction with lid part 110 seals the lateral wall towards the outside towards lid part 110 in a liquid-proof manner. Lid part 110, on which seal 114 is disposed, in interaction with sealing flange 116 of panel component 12 also seals the thus formed channel towards the outside. In this manner, the heated waste heat, which flows into water gutter 118 formed as the channel, can only dissipate via water outlet 120 (see FIG. 3). In FIG. 3, a cut view parallel to longitudinal vehicle direction x is shown. In this context, a rearward portion of roof opening system 108 is shown.

Figure 4:
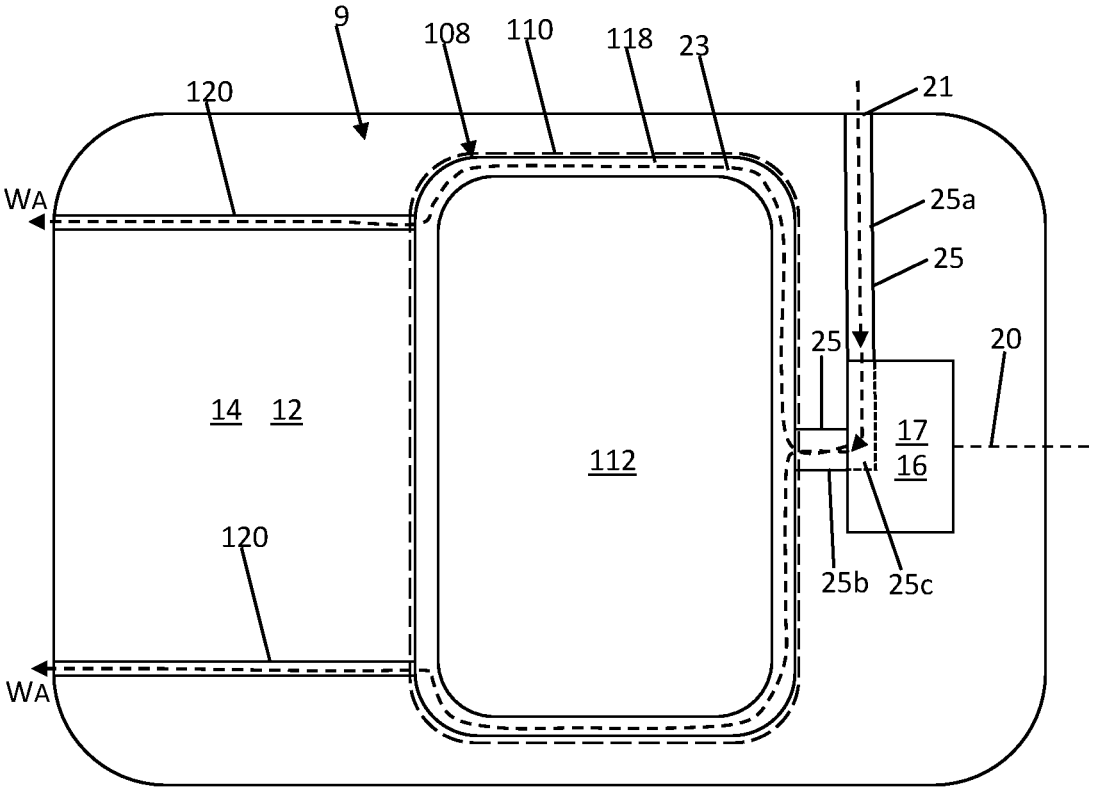
FIG. 4 shows a top view of an exemplary embodiment of a roof module according to the invention.

FIG. 4 shows a top view of a roof module 10 according to an exemplary embodiment of the invention. Lid part 110 is shown merely schematically by dashed lines and in a closed position. While driving vehicle 1000, surrounding air is suctioned into air inlet 21 because of the traveling speed and is guided to component 16 and/or environment sensor 17 via first channel section 25a of further channel 25. First channel section 25a is connected to second channel section 25b via a channel connection 25c. Channel connection 25c is presently disposed below component 16 (behind the drawing plane) and for this reason only indicated by dashed lines. Component 16 is coupled at least with channel connection 25c in a heat-transferring manner. For instance, the waste heat of component 16 can be dissipated to channel connection 25c and/or to further cooling channel 25 via a heat conductor (not shown). A thermal coupling via a heat-conducting tube or the like is also possible. Alternatively or additionally, a casing, in which the at least one component 16 is disposed, can be thermally coupled with further cooling channel 25. Further cooling channel 25 comprises first channel section 25a, second channel section 25b and channel connection 25c. Naturally, further cooling channel 25 can be made in one piece.

The waste heat generated by environment sensor 17 and/or heat introduced from outside to roof module 10 can be dissipated to cooling channel 23, which is at least partially formed by water gutters 118, via further cooling channel 25, which is coupled in a thermal and flowing manner with water gutters 118 and/or with cooling channel 23 formed in this manner. According to FIG. 4, water gutters 118 form a channel frame surrounding roof opening 112. In combination with lid part 110 and sealing flange 116 of panel component 12, water gutter 118 forms cooling channel 23 in its circumferential direction. Water outlets 120 are disposed in the rear leading in the direction of a vehicle rear, on the left and right when viewed in traveling direction x. Heated exhaust air can be discharged from roof module 10 via water outlets 120, which also serve as cooling outlets. Naturally, further cooling channel 25 and/or cooling channel 23 can each extend arbitrarily and/or have any cross section; the shown embodiments do not limit the invention thereto. The flowing direction of the cooling air is shown by arrows and dashed lines.

By using water gutter 118, the heat dissipation can be designed so as to be optimized for the installation space. Provided water is located in cooling channel 23 formed by water gutter 118, a cooling effect can be improved by using an evaporation enthalpy of the water in water gutter 118.

Figure 5:
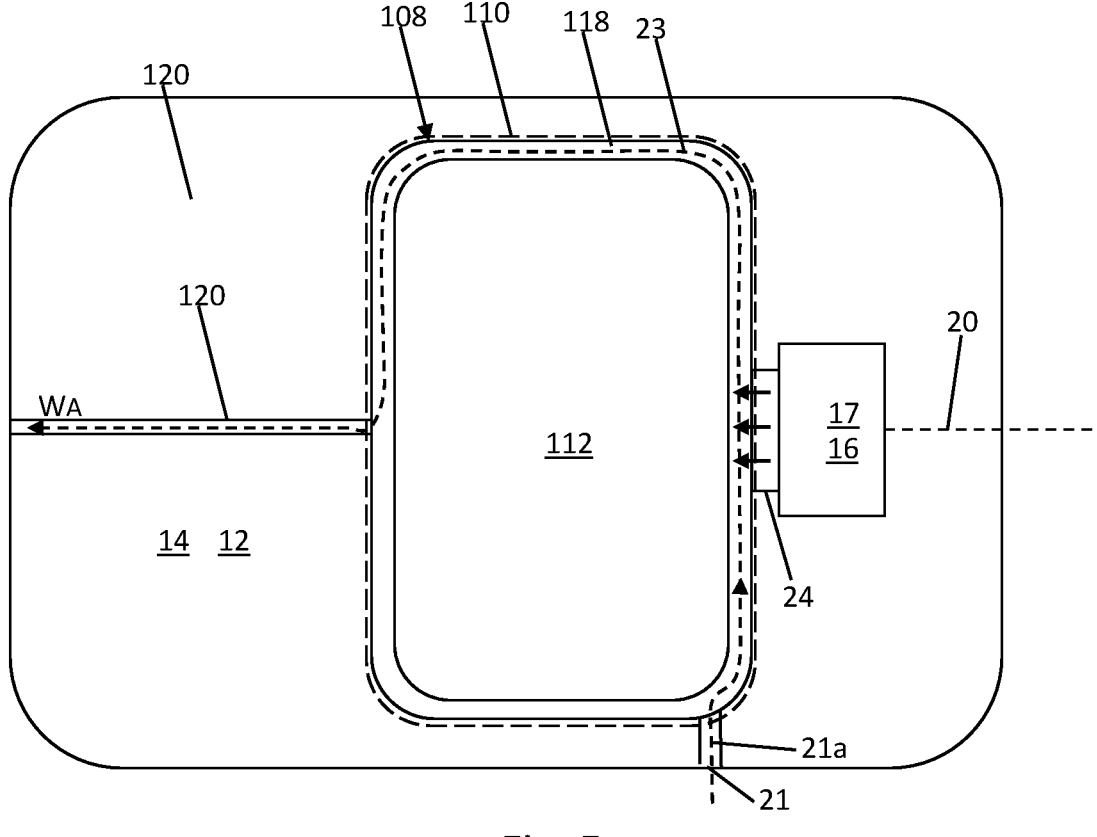
FIG. 5 shows a top view of an exemplary embodiment of a roof module according to the invention.

In FIG. 5, an exemplary embodiment of a roof module 10 is shown for which cooling-air inlet 21 is connected to water gutter 118 in a flow-conducting manner via a supply channel 21a. In this manner, an air stream can flow from the outside to cooling-air channel 21 and be conducted to cooling channel 23 via supply channel 21a while motor vehicle 1000 is in motion. The waste heat from the at least one component 16 is presently introduced to water gutter 118 via a heat conductor 24, which is thermally coupled with a part of water gutter 118, and is accommodated by the incoming surrounding air. The heated surrounding air leaves vehicle 1000 via water outlet 120 disposed at the rear. According to FIG. 5, roof module 10 comprises a rearward water outlet 120 and a frontward cooling-air inlet 21 on the right (when viewed from traveling direction x). In this embodiment, component 16 can therefore be cooled by means of cooling channel 23 formed by water gutter 118, without having to interconnect further cooling channels.

The invention claimed is:

1. A roof assembly for forming a vehicle roof on a motor vehicle, the roof assembly comprising: a panel component which forms at least sections of a roof cladding of the vehicle roof, the roof cladding acting as an outer sealing surface, and a roof opening system having a lid part which is configured to selectively open or close a roof opening provided in the panel component, and at least one electric and/or electronic and/or electromagnetic component and an air conditioner, via which waste heat released by the electronic component and/or heat introduced from outside is able to be dissipated, wherein the roof opening system comprises at least one water gutter via which at least one cooling channel of the air conditioner is formed, the waste heat of the component and/or the heat introduced from outside being able to be drained from the roof assembly via the cooling channel.

2. The roof assembly according to claim 1, wherein the at least one water gutter is disposed in an edge area of the roof opening, so as to surround the roof opening, and is configured to drain water entering through the roof opening via at least one rear and/or frontal and/or lateral water outlet from the roof assembly.

3. The roof assembly according to claim 1, wherein the air conditioner comprises at least one supply channel having a cooling-air inlet, the supply channel being coupled with the water gutter in a flow-conducting manner.

4. The roof assembly according to claim 1, wherein the air conditioner comprises at least one other cooling channel having a cooling-air inlet, at least sections of the at least one other cooling channel being coupled with the water gutter in a flow-conducting manner.

5. The roof assembly according to claim 4, wherein the at least one other cooling channel is coupled with the at least one component in a heat-conducting manner.

6. The roof assembly according to claim 1, wherein the at least one component is coupled with the at least one water gutter in a heat-conducting manner.

7. The roof assembly according to claim 1, wherein the roof opening system comprises at least one set of roof opening kinematics and at least one guide rail, in which the lid part is moveably guided linearly along the at least one guide rail for selectively opening and closing the roof opening, the at least one guide rail comprising the at least one water gutter.

8. The roof assembly according to claim 1, wherein a seal is provided between a sealing flange of the panel component and the lid part, the seal being configured to prevent dampness from entering through the roof opening at least in a closed position of the lid part.

9. The roof assembly according to claim 1, wherein the at least one water gutter comprises an abutment seal which is disposed on an edge of the water gutter and is configured to prevent dampness from entering between the water gutter and the lid part.

10. The roof assembly according to claim 8, wherein the cooling channel is circumferentially limited at least by the water gutter, an abutment seal, the lid part, the seal and the sealing flange in the closed position of the lid part.

11. The roof assembly according to claim 1, wherein the at least one electric and/or electronic component is disposed in a dry compartment of the roof assembly protected against dampness and the waste heat released by the electric and/or electronic component is dissipated from the dry compartment by the air conditioner.

12. The roof assembly according to claim 1, wherein the at least one air conditioner comprises at least one heat conductor and/or at least one cooling body and/or at least one heat pump.

13. The roof assembly according to claim 1, wherein the at least one electric and/or electronic component comprises at least an environment sensor, the environment sensor being able to transmit and/or receive electromagnetic signals for charting the vehicle environment through a see-through area.

14. The roof assembly according to claim 1, wherein the roof assembly comprises a roof module, which is fastened as a structural unit to a vehicle chassis.

15. A motor vehicle, comprising a roof assembly according to claim 1.

16. The roof assembly according to claim 13, wherein the environment sensor is a lidar sensor and/or a radar sensor and/or a camera sensor and/or a multi-camera sensor.

17. The roof assembly according to claim 14, wherein the vehicle chassis is a roof chassis frame via a roof module frame.

5

\* \* \* \* \*